Figure 1:
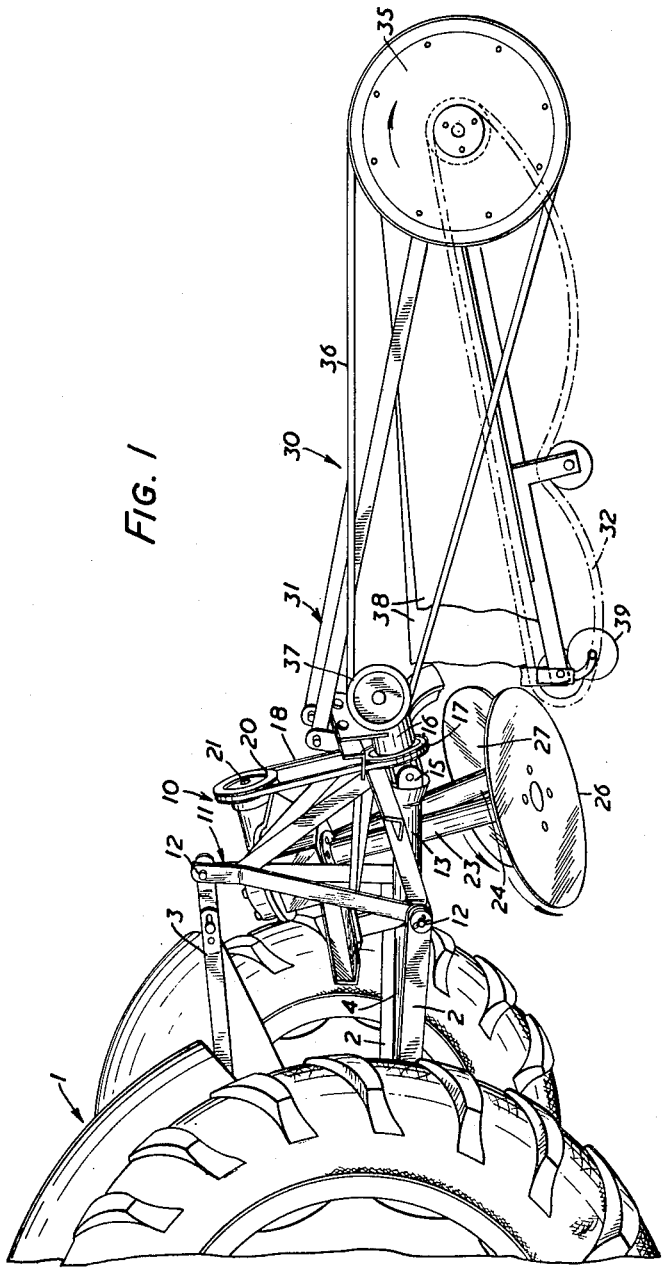

Aug. 18, 1964    J. C. HAWKINS ETAL    3,144,910
SHARES FOR RAISING ROOT CROPS
Filed April 30, 1962    2 Sheets-Sheet 1

INVENTORS
JOHN C. HAWKINS
ROBERT J. OFIELD.

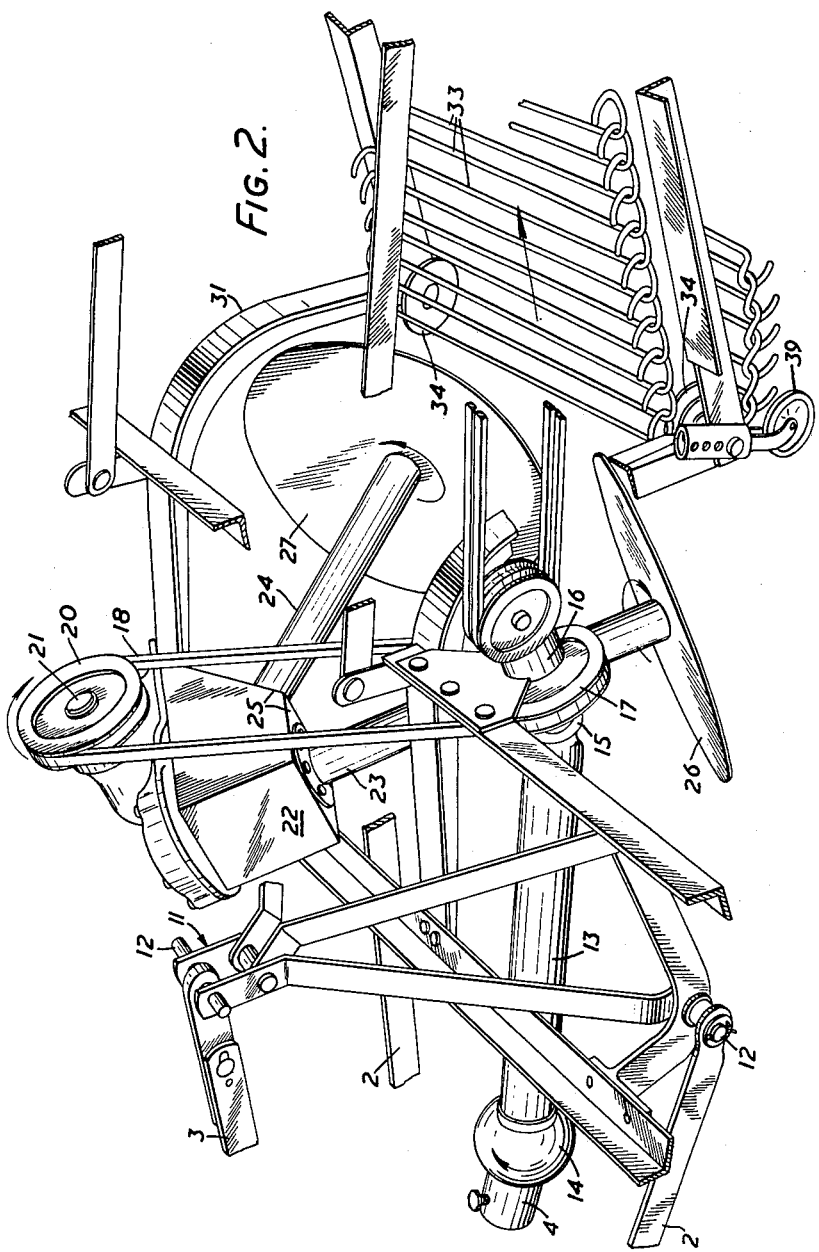

United States Patent Office 3,144,910
Patented Aug. 18, 1964

3,144,910
SHARES FOR RAISING ROOT CROPS
John Clement Hawkins, Clophill, and Robert John Ofield, Silsoe, England, assignors to National Research Development Corporation, London, England, a British corporation
Filed Apr. 30, 1962, Ser. No. 190,954
Claims priority, application, Great Britain, May 3, 1961, 16,077/61
3 Claims. (Cl. 171—58)

This invention relates to machines for use in the harvesting of root crops, the machine having shares for operation on the root crops and the surrounding soil to loosen the soil and, for example, to raise the root crops and surrounding soil on to a conveyor or other mechanism. The term "root crops" is intended to include tubers, such as potatoes, and bulbs and similar crops which grow beneath the ground, in addition to true roots.

Except in ideal conditions there is usually some difficulty in getting a smooth and regular flow of the soil containing the crop over the conventional plate or blade share (hereinafter referred to simply as a plate share) on to a conveyor or other mechanism. This is due to the desirability of working at a shallow depth just below the crop where the soil is usually uncompacted, especially towards the edges of the strip being lifted. Working at a greater depth where the soil is more solid would force the soil over the share but would correspondingly increase the power required to pull the share as well as giving the subsequent soil removal mechanism much more work than it could cope with. What usually happens is that the plate share pushes the loose soil at the sides forward until a large quantity has collected when most of it spills backwards over the share. A great deal, however, spills forward and around the sides of the share, often carrying some of the crop which rolls forwards and sideways and so is burried and lost. This problem is most acute when operating at slow speeds which it is frequently desired to do for a variety of reasons.

It is an object of the present invention to provide a share which eliminates or reduces these disadvantages and which operates efficiently at extremely slow speeds.

According to one aspect of the present invention, a machine for use in the harvesting of root crops includes a share having opposite side walls each of which comprises a disc-like rotor, the general planes of revolution of the rotors lying at an angle to one another of from 45° to 180° with the upper parts of the rotors lying further apart than the lower parts.

Preferably the machine includes transmission means through which power can be transmitted to the rotors to rotate the rotors in such directions that their inner peripheral parts move with a rearward motion relative to the share as a whole during operation.

According to another aspect of the present invention, a machine for use in the harvesting of root crops includes a share for operation on the crop and surrounding soil having opposite side walls each of which comprises a disc-like rotor, the general plane of revolution of the rotors lying at an angle to one another of from 45° to 180° with the upper parts of the rotors lying further apart than the lower parts, and means driving the discs in directions such that their inner peripheral parts move rearwardly relative to the machine as a whole.

It is preferred that the portions of the peripheries of the rotors which are closest together are spaced apart, the spacing which is particularly preferred being between two and twelve inches.

The axis of each rotor may be inclined forwardly to planes transverse to the fore-and-aft axis of the machine. The forward inclination should preferably not exceed 60° and the particularly preferred range is between 10° and 25°. The forward inclination results in the rear parts of the rotors being slightly higher than and slightly closer together than their leading parts during use so that the channel defined between the inclined rotors is slightly convergent and slightly rising from front to rear.

The speed of rotation of the rotors is preferably such that the speed of rearward motion of their inner peripheral parts is approximately equal to the forward speed of the share as a whole or is greater than the forward speed.

The rotors may have a variety of forms. For example a rotor may be in the form of a flat disc which may have a smooth edge or a dished disc with either the convex or concave surface facing inwards towards the other rotor. However, the preferred form of rotor is a flat disc with a smooth edge.

The rotors may be driven in a variety of ways. For example they may be power-driven, for instance from power means driving the machine over the ground, or they may be driven from ground-engaging wheels which are rotated by the motion of the machine over the ground as the share advances.

The drive may be imparted to the rotors through shafts on which the rotors are mounted from either above or beneath the rotors or they may be mounted for free rotation and driven by friction. Preferably the rotors are driven, through shafts to which the rotors are rigidly mounted, the shafts extending from the upwardly facing surfaces of the rotors.

The invention may be performed in various ways and one embodiment will now be described by way of example with reference to the accompanying drawings, in which:

FIGURE 1 is a perspective view from one side of the machine with some parts broken away or omitted for clarity; and FIGURE 2 is a fragmentary perspective view from above, one side and behind of the rotors and associated driving mechanism of the machine shown in FIGURE 1.

Referring now to FIGURES 1 and 2, the machine is drawn by a tractor 1 only the rear part of which is shown in FIGURE 1. The tractor is provided with the conventional three-point linkage at its rear end, the linkage comprising two lower links 2 and an upper link 3 whose attitude relative to the lower links can be varied to lift an implement attached to the linkage as required. The tractor is also provided with a rearwardly extending power take-off shaft 4.

The machine includes a share section 10 which comprises a framework 11 which will not be described in detail. The framework 11 is pivotally secured to the three point linkage of the tractor by pivot pins 12.

The framework carries a rotary shaft 13 which is connected by means of a coupling 14 to the power take-off shaft 4 of the tractor and is connected by means of a universal coupling 15 to a short shaft 16 on which is mounted a belt pulley 17. The common axis of the shaft 16 and the belt pulley 17 is inclined to the horizontal plane containing the fore-and-aft axis of the machine at an angle of approximately 12°, a V-belt 18 connects the belt pulley 17 to a second belt pulley 20 which is secured to the input shaft 21 of a gear box 22 which is mounted on the framework 11. The gear box 22 has two output shafts 23 and 24 which extend perpendicularly from two lower faces 25 of the gear box. The axes of the shafts 23 and 24 intersect at an angle of 50° and the plane in which the axes of the shafts 23 and 24 lie is at the same angle to the vertical as the axis of the shaft 15 is to the horizontal, namely approximately 12°.

At the lower ends of the shafts 23 and 24, which are unsupported and hence unobstructed below the gear box, there are a pair of flat sheet-metal smooth-edged discs 26 and 27 with the adjacent lower edges of the discs spaced from one another by a distance equal to a little more than half the diameter of one of the discs. In the embodiment being described the diameter of each disc is approximately 24 inches (60 cms.). The discs lie at an angle of 130° to one another, this being the supplement of the angle between the shafts 23 and 24. The construction of the gear box 22 is such that the discs rotate in opposite directions and the adjacent lower edges of the discs move rearwardly with respect to the machine as a whole.

Behind the share section 10 is a conveyor section 30 which includes a framework 31 which is supported from the framework 11 of the share section and will not be described in detail. The conveyor section includes an endless riddling conveyor 32 consisting of parallel rods 33. The conveyor passes over freely rotatable wheels 34 at its lower end and passes over driving wheels at its upper end, the driving wheels being driven by a belt pulley 35 which in turn is driven by a belt 36 from a belt pulley 37 which is driven through bevel gears, not visible in the drawings, from the shaft 16. At each side of the conveyor there is a side board 38 to retain material on the conveyor. The side boards 38 are shown in FIG. 1 but are omitted from FIG. 2 for clarity. The conveyor section is provided with a freely rotatable ground wheel 39 whose height relative to the machine as a whole can be adjusted as required.

In operation the machine is driven along a row of crops to be harvested with the discs 26 and 27 lying on each side of the row and with their inner edges dipping into the soil surrounding the crop. The discs are driven at such a speed that their inner edges are moving rearwardly at approximately the same speed as the machine as a whole is moving forwardly. The discs tend to gather soil towards the space between the discs and draw it rearwardly towards the conveyor. By virtue of the inclination of the discs to one another and the forward inclination of their axes the channel formed between the discs rises towards the rear and in any given horizontal plane, narrows towards the rear. The soil and the crops it contains are thus lifted by the discs and are deposited on to the conveyor. The soil drops between the bars 33 of the conveyor 32 while the crop is retained and drops on to the surface of the soil from the rear end of the conveyor to be picked up at a later stage.

Numerous modifications of the machine can be made within the scope of the invention. The angle of inclination of the discs to one another and the angle of inclination of the axes of the discs to the vertical can be varied within wide limits depending on the nature of the crop to be harvested and the soil in which it is contained. The rotors may take other forms than the flat discs described. The conveyor section 30 may take other forms than that described or may in certain circumstances be omitted altogether. The discs may be driven from a power source separate from that providing power to move the machine over the ground or may be driven from the ground wheels.

What we claim as our invention and desire to secure by Letters Patent is:

1. A machine for use in the harvesting of root crops comprising a frame, a ground-engaging share carried by the frame, said share having opposite side walls each of which comprises a disc-like rotor, each of said disc-like rotor having an upwardly extending shaft axis fixed thereto, the inner peripheries of said rotors being adjacent to but spaced from each other, the general planes of revolution of said rotors lying at an angle to one another of between 45° and 180°, the axes of rotation of said rotors extending upwardly at an acute angle to the vertical and intersecting above said rotors, and drive means connected to said rotors to rotate said rotors in directions to produce rearward movement of the inner peripheries of said rotors.

2. A machine for use in the harvesting of root crops including a frame, a gear box mounted on said frame, said gear box having an input shaft and two output shafts, said output shafts extending generally downwardly from the gear box at an acute angle to the vertical and having an angle between their longitudinal axes of between 0° and 130° and a disc fixed to the lower end of each of said shafts to rotate with said shafts, the inner peripheries of said discs being adjacent to but spaced from each other, said discs comprising the walls of a digging share which is V-shaped in vertical cross-sections.

3. A machine for use in the harvesting of root crops growing in rows comprising a frame, two shafts rotatably mounted on said frame and having longitudinal axes, said longitudinal axes lying in a plane which is transverse to the fore-and-aft axis of said machine and is inclined forwardly to the vertical by at least 5°, said longitudinal axes having an angle between them of between 30° and 90°, a ground-engaging disc fixed to and carried at the lower end of each of said shafts, the inner peripheries of said discs being laterally spaced from and adjacent to one another to form a digging share for digging up root crops of a single row and having a V-shaped cross-section in vertical planes transverse to the fore-and-aft axis of said machine, and drive means connected to said shafts to rotate said discs in directions to produce rearward movement of the inner peripheries of said discs.

References Cited in the file of this patent

UNITED STATES PATENTS

| | | |
|---|---|---|
| 2,606,416 | Bruner | Aug. 12, 1952 |
| 2,842,215 | Morrison | July 8, 1958 |
| 3,065,800 | Faust et al. | Nov. 27, 1962 |

FOREIGN PATENTS

| | | |
|---|---|---|
| 1,178,842 | France | May 15, 1959 |
| 97,299 | Norway | Jan. 2, 1961 |